US010506322B2

(12) United States Patent
Martin et al.

(10) Patent No.: US 10,506,322 B2
(45) Date of Patent: Dec. 10, 2019

(54) WEARABLE DEVICE ONBOARD APPLICATIONS SYSTEM AND METHOD

(71) Applicant: BRAGI GmbH, München (DE)

(72) Inventors: Toby Martin, Munich (DE); Eric Christian Hirsch, Munich (DE); Veniamin Milevski, Munich (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/290,711

(22) Filed: Oct. 11, 2016

(65) Prior Publication Data

US 2017/0111726 A1    Apr. 20, 2017

Related U.S. Application Data

(60) Provisional application No. 62/244,163, filed on Oct. 20, 2015.

(51) Int. Cl.
| | | |
|---|---|---|
| *H04R 1/10* | (2006.01) | |
| *H04W 4/80* | (2018.01) | |
| *G06F 3/0488* | (2013.01) | |
| *G10L 15/22* | (2006.01) | |
| *H04N 5/225* | (2006.01) | |

(Continued)

(52) U.S. Cl.
CPC ......... *H04R 1/1041* (2013.01); *G06F 3/017* (2013.01); *G06F 3/04883* (2013.01); *G10L 15/22* (2013.01); *H04N 5/2252* (2013.01); *H04N 5/2257* (2013.01); *H04R 1/1016* (2013.01); *H04W 4/80* (2018.02); *H04B 2001/3866* (2013.01); *H04R 2420/07* (2013.01)

(58) Field of Classification Search
CPC ...................................................... G06F 3/017
See application file for complete search history.

(56) References Cited

U.S. PATENT DOCUMENTS

| | | | |
|---|---|---|---|
| 2,325,590 | A | 8/1943 | Carlisle et al. |
| 2,430,229 | A | 11/1947 | Kelsey |
| 3,047,089 | A | 7/1962 | Zwislocki |

(Continued)

FOREIGN PATENT DOCUMENTS

| | | |
|---|---|---|
| CN | 204244472 U | 4/2015 |
| CN | 104683519 A | 6/2015 |

(Continued)

OTHER PUBLICATIONS

Announcing the $3,333,333 Stretch Goal (Feb. 24, 2014).

(Continued)

*Primary Examiner* — Kile O Blair
(74) *Attorney, Agent, or Firm* — Goodhue, Coleman & Owens, P.C.

(57) ABSTRACT

An earpiece wearable includes an earpiece wearable housing, an intelligent control system disposed within the ear piece wearable housing, and an operating system associated with the intelligent control system for the earpiece wearable wherein the operating system provides for a user of the earpiece to choose between a plurality of software applications to execute on the intelligent control system. A method includes installing on the earpiece wearable a plurality of different software applications and selecting one of the plurality of software applications to execute on the intelligent control system of the earpiece wearable using the operating system of the earpiece wearable.

19 Claims, 4 Drawing Sheets

(51) Int. Cl.
*G06F 3/01* (2006.01)
*H04B 1/3827* (2015.01)

(56) References Cited

U.S. PATENT DOCUMENTS

| | | |
|---|---|---|
| D208,784 S | 10/1967 | Sanzone |
| 3,586,794 A | 6/1971 | Michaelis |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Amdt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Amdt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,825,626 B2 | 11/2010 | Kozisek |
| 7,925,029 B2 * | 4/2011 | Hollemans ........... H04R 1/1041 381/151 |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin |
| 8,436,780 B2 | 5/2013 | Schantz et al. |
| D687,021 S | 7/2013 | Yuen |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| D788,079 S | 5/2017 | Son et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |

(56) References Cited

U.S. PATENT DOCUMENTS

| | | |
|---|---|---|
| 2005/0017842 A1 | 1/2005 | Dematteo |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2007/0274530 A1* | 11/2007 | Buil .............. H04R 1/1041 381/74 |
| 2008/0076972 A1 | 3/2008 | Dorogusker et al. |
| 2008/0090622 A1 | 4/2008 | Kim et al. |
| 2008/0146890 A1 | 6/2008 | LeBoeuf et al. |
| 2008/0254780 A1 | 10/2008 | Kuhl et al. |
| 2008/0255430 A1 | 10/2008 | Alexandersson et al. |
| 2009/0003620 A1 | 1/2009 | McKillop et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0191920 A1 | 7/2009 | Regen et al. |
| 2009/0245559 A1 | 10/2009 | Boltyenkov et al. |
| 2009/0296968 A1 | 12/2009 | Wu et al. |
| 2010/0033313 A1 | 2/2010 | Keady et al. |
| 2010/0203831 A1 | 8/2010 | Muth |
| 2010/0210212 A1 | 8/2010 | Sato |
| 2010/0245585 A1* | 9/2010 | Fisher .............. H04M 1/6066 348/164 |
| 2010/0320961 A1 | 12/2010 | Castillo et al. |
| 2011/0286615 A1 | 11/2011 | Olodort et al. |
| 2012/0057740 A1 | 3/2012 | Rosal |
| 2012/0274609 A1* | 11/2012 | Sheng .............. G06F 3/0418 345/177 |
| 2013/0316642 A1 | 11/2013 | Newham |
| 2013/0346168 A1 | 12/2013 | Zhou et al. |
| 2014/0072146 A1 | 3/2014 | Itkin et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0163771 A1 | 6/2014 | Demeniuk |
| 2014/0185828 A1 | 7/2014 | Helbling |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0348367 A1 | 11/2014 | Vavrus et al. |
| 2015/0028996 A1 | 1/2015 | Agrafioti et al. |
| 2015/0085059 A1 | 3/2015 | Fisher et al. |
| 2015/0110587 A1 | 4/2015 | Hori |
| 2015/0148989 A1 | 5/2015 | Cooper et al. |
| 2015/0245127 A1 | 8/2015 | Shaffer |
| 2016/0033280 A1 | 2/2016 | Moore et al. |
| 2016/0072558 A1 | 3/2016 | Hirsch et al. |
| 2016/0073189 A1 | 3/2016 | Lindén et al. |
| 2016/0125892 A1 | 5/2016 | Bowen et al. |
| 2016/0360350 A1 | 12/2016 | Watson et al. |
| 2017/0078780 A1 | 3/2017 | Qian et al. |
| 2017/0111726 A1 | 4/2017 | Martin et al. |
| 2017/0155992 A1 | 6/2017 | Perianu et al. |

FOREIGN PATENT DOCUMENTS

| | | |
|---|---|---|
| CN | 104837094 A | 8/2015 |
| EP | 1017252 A2 | 7/2000 |
| EP | 1469659 A1 | 10/2004 |
| EP | 2903186 A1 | 8/2015 |
| GB | 2074817 | 4/1981 |
| GB | 2508226 A | 5/2014 |
| WO | 2008103925 A1 | 8/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up (Nov. 13, 2015).
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—On Track, Design Verification, How It Works and What's Next(Jul. 15, 2015).
BRAGI Update—On Track, on Track and Gems Overview (Jun. 24, 2015).
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).

(56) References Cited

OTHER PUBLICATIONS

The Dash + The Charging Case & the BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
International Search Report and Written Opinion, PCT/EP16/75127, (dated Jan. 11, 2017).
Akkermans, "Acoustic Ear Recognition for Person Identification", Automatic Identification Advanced Technologies, 2005 pp. 219-223.
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI Update—Getting Close(Aug. 6, 2015).
Healthcare Risk Management Review, "Nuance updates computer-assisted physician documentation solution" (Oct. 20, 2016).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, Californa (2017).
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Weisiger; "Conjugated Hyperbilirubinemia", Jan. 5, 2016.

\* cited by examiner

WEARABLE DEVICE ONBOARD APPLICATIONS SYSTEM AND METHOD

PRIORITY STATEMENT

This application claims priority to U.S. Provisional Patent Application 62/244,163, filed on Oct. 20, 2015, and entitled Wearable Device Onboard Application System and Method, hereby incorporated by reference in its entirety.

FIELD OF THE INVENTION

The present invention relates to wearable devices. More particularly, but not exclusively, the present invention relates to ear pieces.

BACKGROUND

A wireless earpiece may provide various features including the ability of providing a new and immersive experience for the user and the ability to track multiple biometric measurements simultaneously. However, what is needed is a system and method to expand the use and capabilities of the device as a platform to allow native applications to run from the device itself, without having to rely on a linked smartphone or other connected device.

SUMMARY

Therefore, it is a primary object, feature, or advantage of the present invention to improve over the state of the art.

It is a further object, feature, or advantage of the present invention to provide new systems for access and control of onboard applications for an earpiece wearable.

It is a still further object, feature, or advantage of the present invention to provide new methods for access and control of onboard applications for an earpiece wearable.

Another object, feature, or advantage is to allow a user to run applications on an earpiece wearable without any ongoing connection to a linked device.

Yet another object, feature, or advantage is to allow a user to determine the level of cooperation of the onboard earpiece programs with linked programs residing on other devices.

A further object, feature, or advantage is to allow a user to transfer or receive data accumulated in the onboard applications through various physical means, whether they are connected physically, short range wireless, long range wireless or through other means.

A still further object, feature, or advantage is to allow the user to transfer or receive data instantaneously, periodically or in archived fashions.

Another object, feature, or advantage is to allow the user to interact with the onboard applications through the operating system of the earpiece wearable through touch, voice, gesture, camera based imaging, ultrasound, radar based movement detection or other forms of interactions.

Yet another object, feature, or advantage is to allow a user to store data on the device within the application.

A further object, feature, or advantage is to allow the user to determine how much, if any, data they will share from the onboard applications.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, an earpiece wearable includes an earpiece wearable housing, an intelligent control system disposed within the ear piece wearable housing and an operating system associated with the intelligent control system for the earpiece wearable wherein the operating system provides for a user of the earpiece to choose between a plurality of software applications to execute on the intelligent control system. The earpiece wearable may further include a user interface associated with the intelligent control system to allow for user input to the operating system. The user interface may be a gesture based user interface having least one sensor configured to detect user gestures. The user interface may be a voice control user interface having at least one microphone operatively connected to the intelligent control system. The user interface may be a touch-based user interface, or other type of user interface.

According to another aspect, a method includes providing, an earpiece wearable, the earpiece wearable comprising an earpiece wearable housing, an intelligent control system disposed within the ear piece wearable housing, and an operating system associated with the intelligent control system for the earpiece wearable, installing on the earpiece wearable a plurality of different software applications, and selecting one of the plurality of software applications to execute on the intelligent control system of the earpiece wearable using the operating system of the earpiece wearable.

DETAILED DESCRIPTION

An earpiece wearable is provided with an onboard system for the presentation, organization and access to applications built specifically for native use on the platform. Each application may be able to function independently of a smartphone or other mobile device. Each application may be able to link to corresponding applications on smartphones or other connected devices, but would not be dependent upon them for function. The earpiece device operating system may allow the user to select the particular onboard application to be run as well as to provide a control system for activation as well as other functions such as pausing, sharing and terminating the application. These controls may be voice, gesture based, accelerometer/magnetometer/gyrometer based or other onboard system. The system may interact with the applications natively, i.e. without any requirement for control functions placed upon a linked device. Of course, based upon the specific nature of the native earpiece application, certain functions may be shared with a linked device for instantaneous, delayed or archived transmissions of aggregated data.

Figure 1:
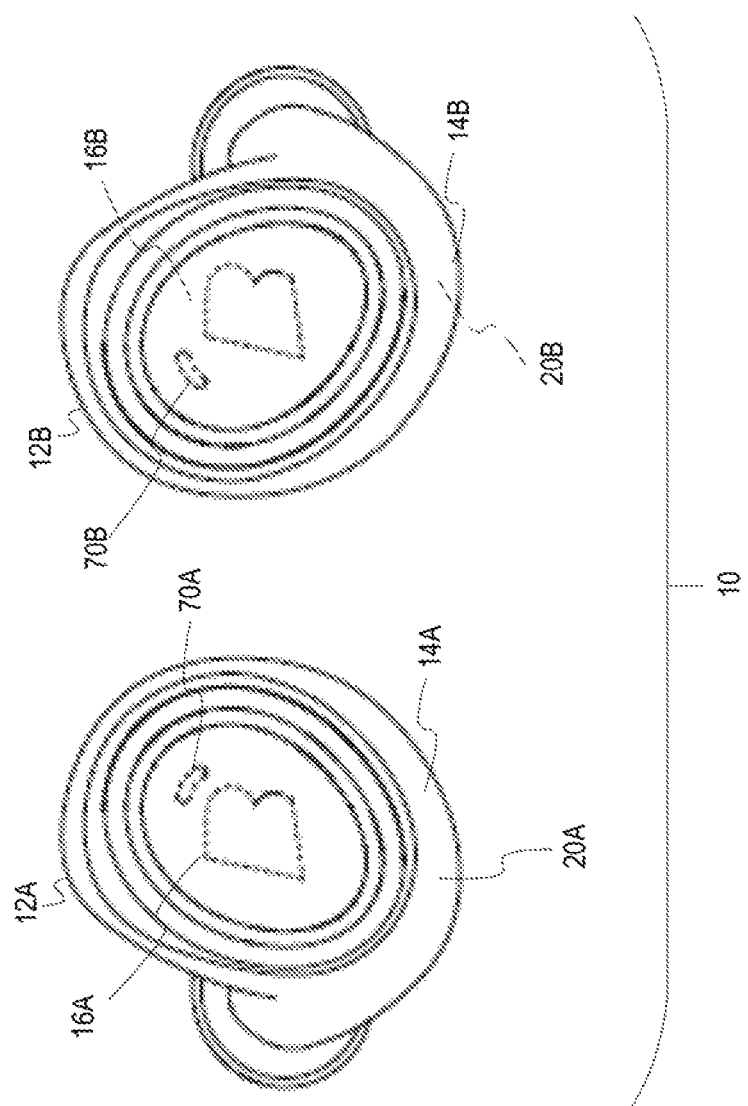
FIG. 1 illustrates a set of wireless earpiece wearables.

FIG. 1 illustrates a set of earpiece wearables 10 which includes a left earpiece 12A and a right earpiece 12B, Each of the earpieces wearables 12A, 12B has an earpiece wearable housing 14A, 14B which may be in the form of a protective shell or casing and may be an in-the-ear earpiece housing. A left infrared through ultraviolet spectrometer 16A and right infrared through ultraviolet spectrometer 1613 is also shown. Each earpiece 12A, 12B may include one or more microphones 70A, 70B. Note that the air microphones 70A, 70B are outward facing such that the air microphones 70A, 70B may capture ambient environmental sound. It is to be understood is that any number of microphones may be present including air conduction microphones, bone conduction microphones, or other audio sensors.

Figure 2:
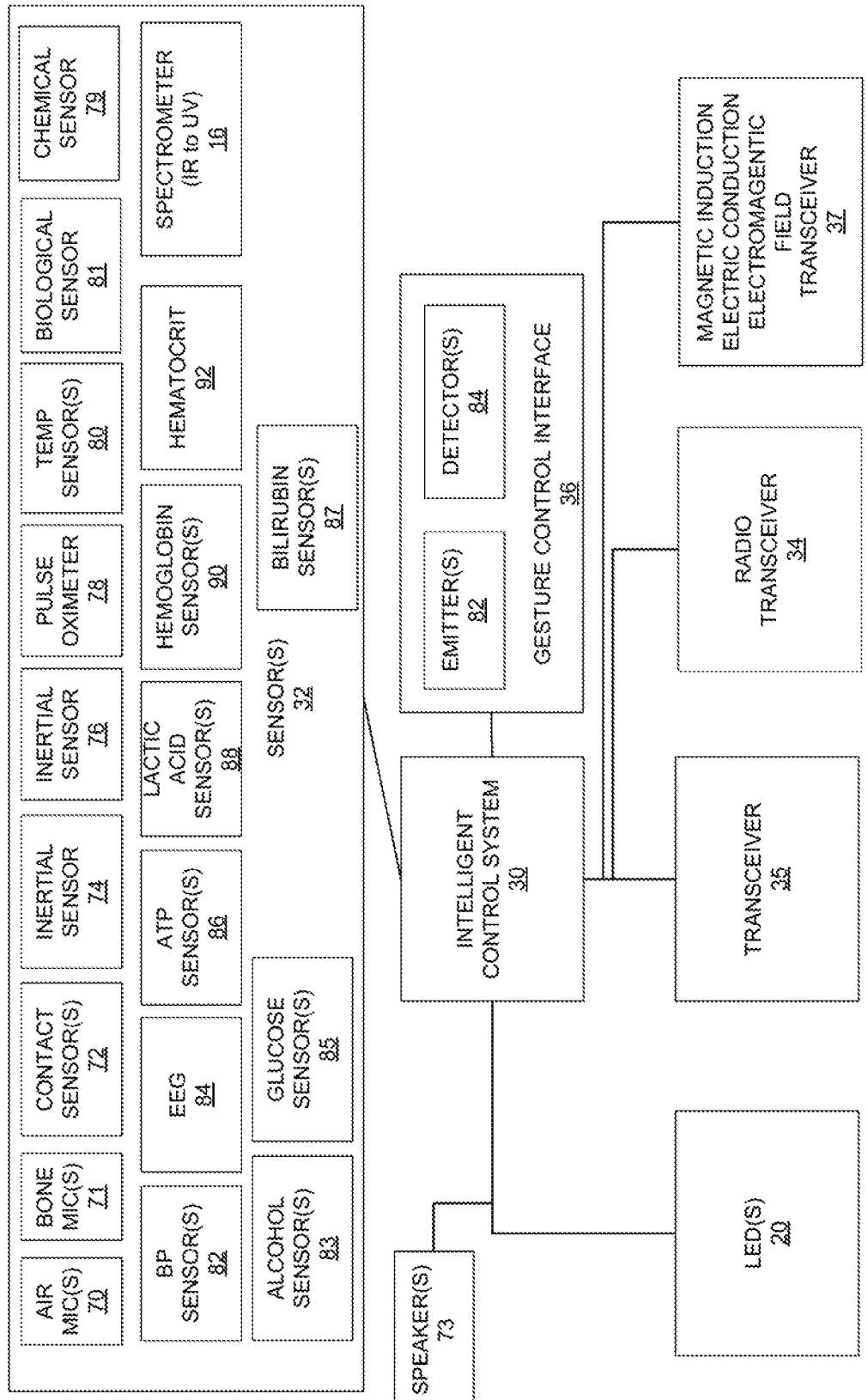
FIG. 2 illustrates a block diagram of one example of a wireless earpiece wearable.

FIG. 2 is a block diagram illustrating a device. The device may include one or more LEDs 20 electrically connected to an intelligent control system 30. The intelligent control system 30 may include one or more processors, microcontrollers, application specific integrated circuits, or other types of integrated circuits. The intelligent control system 30 may also be electrically connected to one or more sensors 32. Where the device is an earpiece, the sensor(s) may include an inertial sensor 74, another inertial sensor 76. Each inertial sensor 74, 76 may include an accelerometer, a gyro sensor or gyrometer, a magnetometer or other type of inertial sensor. The sensor(s) 32 may also include one or more contact sensors 72, one or more bone conduction microphones 71, one or more air conduction microphones 70, one or more chemical sensors 79, a pulse oximeter 76, a temperature sensor 80, or other physiological or biological sensor(s). Further examples of physiological or biological sensors include an alcohol sensor 83, glucose sensor 85, or bilirubin sensor 87. Other examples of physiological or biological sensors may also be included in the device. These may include a blood pressure sensor 82, an electroencephalogram (EEG) 84, an Adenosine Triphosphate (ATP) sensor, a lactic acid sensor 88, a hemoglobin sensor 90, a hematocrit sensor 92 or other biological or chemical sensor.

A spectrometer 16 is also shown. The spectrometer 16 may be an infrared (IR) through ultraviolet (UV) spectrometer although it is contemplated that any number of wavelengths in the infrared, visible, or ultraviolet spectrums may be detected. The spectrometer 16 is preferably adapted to measure environmental wavelengths for analysis and recommendations and thus preferably is located on or at the external facing side of the device.

A gesture control interface 36 is also operatively connected to or integrated into the intelligent control system 30. The gesture control interface 36 may include one or more emitters 82 and one or more detectors 84 for sensing user gestures. The emitters may be of any number of types including infrared LEDs. The device may include a transceiver 35 which may allow for induction transmissions such as through near field magnetic induction. A short range transceiver 34 using Bluetooth, BLE, UWB, or other means of radio communication may also be present. In operation, the intelligent control system 30 may be configured to convey different information using one or more of the LED(s) 20 based on context or mode of operation of the device. The various sensors 32, the processor 30, and other electronic components may be located on the printed circuit board of the device. One or more speakers 73 may also be operatively connected to the intelligent control system 30.

A magnetic induction, electric conduction, or other type of electromagnetic (E/M) field transceiver 37 or other type of transceiver is also operatively connected to the intelligent control system 30 to link the processor 30 to the electromagnetic field of the user. The use of the E/M transceiver 37 allows the device to link electromagnetically into a personal area network or body area network or other device.

Figure 3:
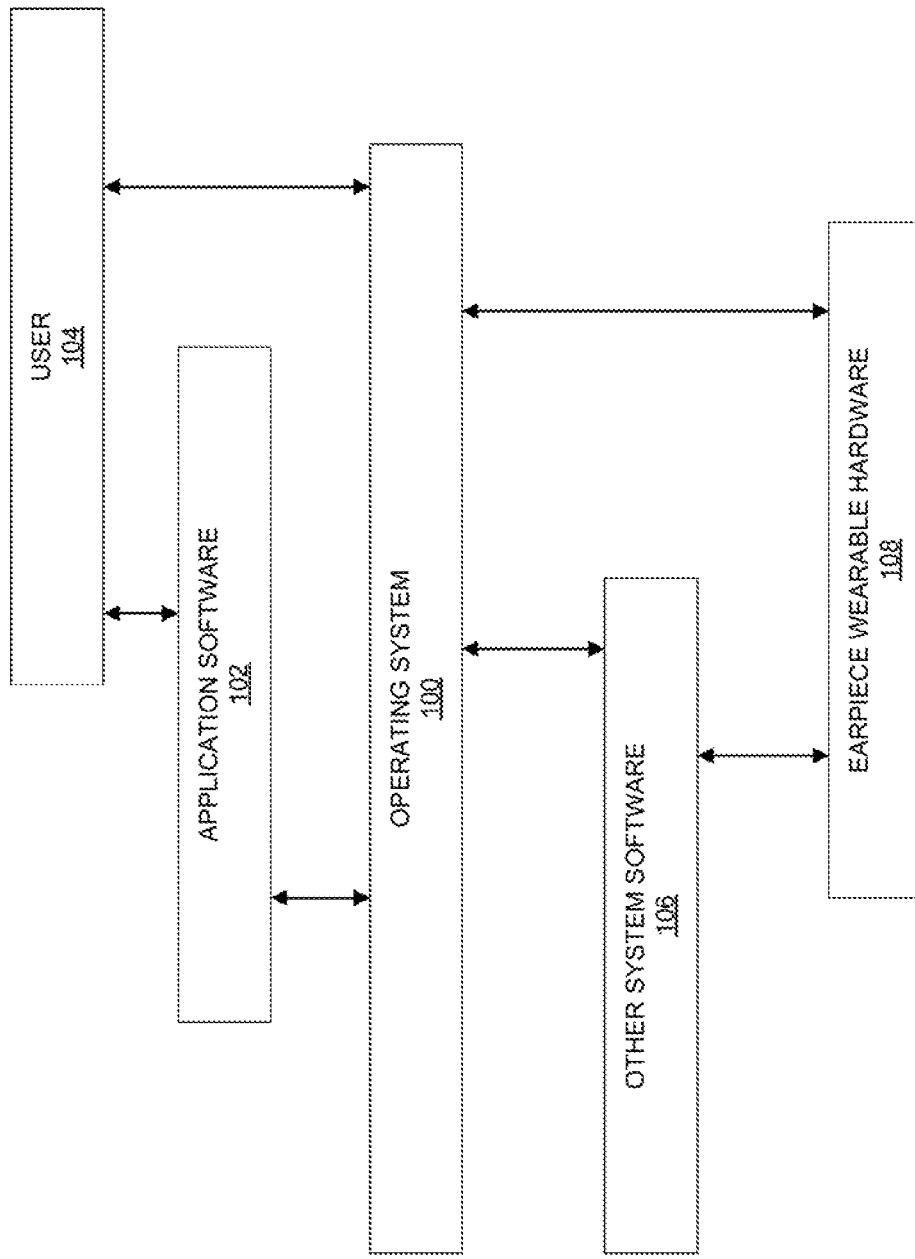
FIG. 3 illustrates interaction between an operating system of an earpiece wearable, application software, a user, other system software, and earpiece wearable hardware.

FIG. 3 illustrates an overview of the relationship between the operating system 100 of the earpiece wearable and other aspects. The operating system 100 is shown. The operating system 100 may perform various functions associated with operation of the earpiece wearable. This may include managing the earpiece's resources including hardware components, software, and other resources. It may also serve as a resource allocator. It may also be used to control programs and to prevent errors or improper use of resources. It may be interrupt driven. The operating system may provide for any number of different benefits. These may include simplifying hardware control for the various application and to enforce sharing, fairness, and security as well as to provide various abstract resources to the different applications.

The operating system 100 communications with application software 102. The application software 102 may be software from the manufacturer of the earpiece wearable or may be third party software. A user 104 of the earpiece wearable may interact with the application software 102 or directly with the operating system 100. This may occur in various ways based in part on the type or user interface(s) available. The user interface may be of any number of types and the device may have more than one user interface. For example, the user interface may be a voice control user interface. In such an instance, the device may include one or more microphones. The user interface may be a touch-based user interface and may include one more manual inputs or touch sensors. The user interface may be an imaging based user interface and the device may include one or more imaging sensors or cameras to acquire images which are processed in order for a user to interact with the device. The user interface may provide for detecting user input through various types of emitters and receivers including for is infrared, ultrasound, radar or other technologies. The operating system 100 may also interact with other system software 106. Both the operating system 100 and other system software 106 may interact with the earpiece wearable hardware 108. This may include, but is not limited to, the types of components shown in FIG. 2.

Figure 4:
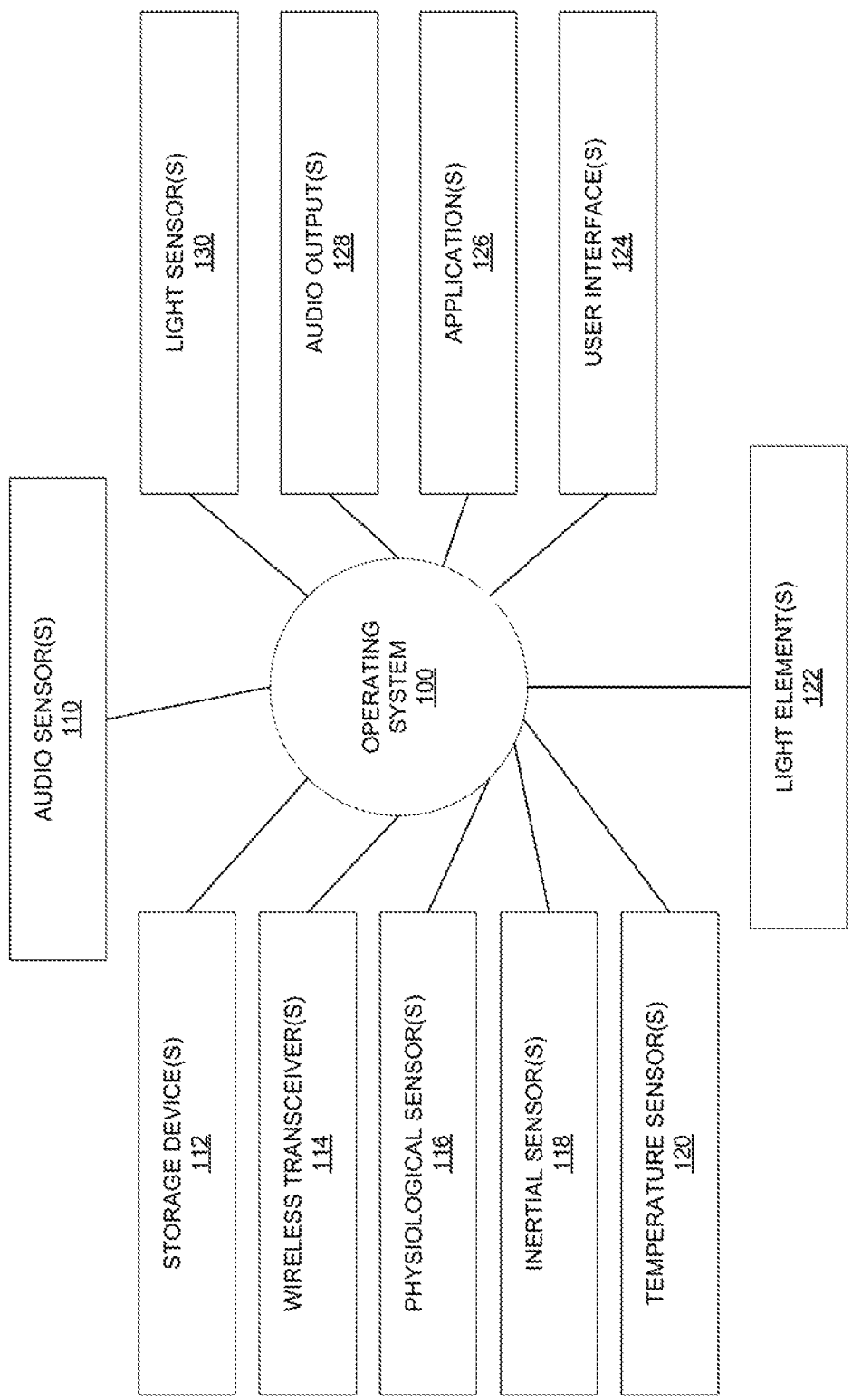
FIG. 4 illustrates interaction between an operating system of an earpiece wearable and various hardware components, user interfaces, and applications.

FIG. 4 further illustrates the interaction of the operating system 100 with various hardware components and applications. As shown in FIG. 4, the operating system 100 may provide for interacting with, communicating with, and/or controlling: one or more audio sensors 110 such as microphones; one or more wireless transceivers 114; one or more physiological sensors 116; one or more inertial sensors 118; one or more temperature sensors 120, one or more light elements 122 such as LEDs; one or more user interfaces 124; one or more applications 126; one or more audio outputs 128 such as speakers; and one or more light sensors 130 such as light photometers or detectors. Although various hardware components have been shown and described throughout, these hardware components are merely representative examples and other hardware components may be present. Similarly, different embodiments of earpiece wearables may have different hardware components.

One example of an application is to receive and curate playlists for the user from the device itself without the need to have an accompanying smartphone or other connected device. Note that the operating system provides access to the necessary resources to do so include one or more audio output devices such as speakers, the storage component for storing the songs or other audio files within the playlists, and a wireless transceiver to communicate information (such as streaming audio) to a second earpiece Where stereo sound is desired. Such an application may receive user input through various interfaces. This may include through voice control, by tapping on the earpiece itself, through gestures near the earpiece, through head movements or other types of movements, or otherwise.

Other applications may be associated with audio playback, physiological sensing, or any number of other features or functionalities of the device itself without requiring interaction with a connected device such as a mobile device.

It should also be apparent that the use of an operating system allows for the introduction of increased security for the device. For example, the device itself can be used to determine how much sharing is performed with other devices, when to communicate with other devices, and provide other functions. However, the ability to run separate applications on the earpiece wearable allows for added functionality from the user perspective, the ability to receiver user input into different applications, all without requiring re-design of the operating system.

Therefore, various examples of systems, devices, apparatus, and methods associated with an earpiece wearable with an operating system have been shown and described. Although various embodiments and examples have been set forth, the present invention contemplates numerous variations, options, and alternatives. For example any number of methods of interaction between the user and the earpiece application are contemplated, any number of linkages to any number of different types of connected devices, whether such devices are directly connected via short range wireless linkages, physical linkages, or other linkage methodologies.

What is claimed is:

1. An earpiece wearable comprising:
an in-the-ear earpiece wearable housing;
an intelligent control system disposed within the in-the-ear earpiece wearable housing;
an operating system associated with the intelligent control system for the earpiece wearable; and
a user interface associated with the intelligent control system and the operating system;
wherein the operating system provides for a user of the earpiece wearable to choose between a plurality of software applications to execute on the intelligent control system;
wherein the operating system is programmed to allocate resources associated with the plurality of software applications and is configured to pause, share, and terminate each of the plurality of software applications;
wherein the user can determine a level of cooperation of the plurality of software applications with linked software programs residing on a linked device; and
wherein the user interface allows for user input to the operating system to allow the user to pause, share a user-determined amount of data and terminate each of the plurality of software applications and set the level of cooperation of the plurality of software applications with the linked software residing on the linked device.

2. The earpiece wearable of claim 1 wherein the user interface is a gesture-based user interface.

3. The earpiece wearable of claim 2 wherein the gesture-based user interface comprises at least one sensor configured to detect user gestures.

4. The earpiece wearable of claim 1 wherein the user interface is a voice control user interface.

5. The earpiece wearable of claim 4 further comprising at least one microphone operatively connected to the intelligent control system.

6. The earpiece wearable of claim 1 wherein the user interface is a touch-based user interface.

7. The earpiece wearable of claim 6 further comprising one or more touch sensors operatively connected to the intelligent control system.

8. The earpiece wearable of claim 1 wherein the user interface is an imaging-based user interface.

9. The earpiece wearable of claim 8 further comprising one or more cameras operatively connected to the intelligent control system.

10. The earpiece wearable of claim 1 wherein the user interface provides for detecting user input through ultra sound or radar.

11. The earpiece wearable of claim 10 further comprising one or more sensors operatively connected to the intelligent control system for detecting at least one of ultra sound or radar.

12. The earpiece of claim 1 further comprising a wireless transceiver disposed within the earpiece wearable housing.

13. The earpiece wearable of claim 12 wherein the intelligent control system is configured to communicate data from one or more of the applications to a remote device.

14. The earpiece wearable of claim 1, wherein the user can execute the software applications on the earpiece wearable without any ongoing connection to the linked device.

15. A method for access and control of an earpiece wearable, the earpiece wearable comprising:
an in-the-ear earpiece wearable housing,
an intelligent control system disposed within the in-the-ear earpiece wearable housing,
an operating system associated with the intelligent control system for the earpiece wearable, and
a user interface associated with the intelligent control system and the operating system;
the method comprising the steps of:
installing on the earpiece wearable a plurality of software applications;
allocating resources for the plurality of software applications via the operating system;
receiving a selection of one of the plurality of software applications to execute on the intelligent control system of the earpiece wearable from a user through the user interface of the earpiece wearable; and
receiving instructions from the user instructing a user-determined amount of data to be shared from the software applications.

16. The method of claim 15 wherein the earpiece wearable further comprises a wireless transceiver disposed within the earpiece wearable.

17. The method of claim 16 further comprising sending data from one of the plurality of software applications to a remote device using the wireless transceiver.

18. The method of claim 16 further comprising receiving data from a remote device into one of the plurality of software applications using the wireless transceiver.

19. An earpiece wearable comprising:
an earpiece wearable housing;
an intelligent control system disposed within the earpiece wearable housing;
an operating system associated with the intelligent control system for the earpiece wearable; and
a user interface associated with the intelligent control system and the operating system;
a plurality of software applications stored on the earpiece wearable for execution by the intelligent control system;

wherein the operating system provides for a user of the earpiece wearable to choose between the plurality of software applications to execute on the intelligent control system;

wherein the operating system is programmed to allocate resources associated with the plurality of software applications and is configured to pause, share a user-determined amount of data, and terminate each of the plurality of software applications; and wherein the user interface allows for user input to the operating system.

\* \* \* \* \*